(No Model.)

R. A. BREUL.
LINK FOR CONNECTING CHAINS.

No. 375,045. Patented Dec. 20, 1887.

Witnesses
E. D. Smith
C. E. Ruggles

Inventor
Richard A. Breul
By A. M. Wooster
Atty.

N. PETERS, Photo-Lithographer, Washington, D. C.

UNITED STATES PATENT OFFICE.

RICHARD A. BREUL, OF BRIDGEPORT, CONNECTICUT, ASSIGNOR TO THE BRIDGEPORT CHAIN COMPANY, OF SAME PLACE.

LINK FOR CONNECTING CHAINS.

SPECIFICATION forming part of Letters Patent No. 375,045, dated December 20, 1887.

Application filed April 18, 1887. Serial No. 235,154. (No model.)

*To all whom it may concern:*

Be it known that I, RICHARD A. BREUL, a citizen of the United States, residing at Bridgeport, in the county of Fairfield and State of Connecticut, have invented certain new and useful Improvements in Links for Connecting Chains; and I do hereby declare the following to be a full, clear, and exact description of the invention, such as will enable others skilled in the art to which it appertains to make and use the same.

My invention relates to the manufacture of what are termed "divided" or "split" links for joining pieces of chain and similar uses, and has for its object to improve their construction, so that the strength at the divided end shall be greatly increased, while at the same time a graceful outline shall be retained both in plan and edge view, and clumsiness in operation shall be avoided. Links of this class are ordinarily formed by lapping the ends past each other and removing metal from the inner side of each end, so that the flattened sides will lie closely against each other. It will of course be apparent that the greater the amount of metal that is removed from the inner side of each end the neater will be the appearance of the finished link. This neatness of appearance, however, necessitates a corresponding loss of strength. It will be seen, therefore, that as these links are ordinarily made the manufacturer is compelled to choose between clumsiness and strength, as in order to produce a neat appearance he must remove metal at just the portion of the link where it is most needed. It has been demonstrated repeatedly by practical tests that even if the full strength of the metal is retained at the divided end that end is still considerably weaker than the other end and than ordinary soldered links. It will be apparent, therefore, that when used upon large windows necessitating heavy weights, in the attachment of stoppers to the chains in wash-bowls, and in numerous other uses, it is necessary that divided links shall be made as strong as possible, while at the same time it is desirable that the appearance of the finished links should be made as neat as possible, and that clumsiness should be avoided. In order to accomplish these results I have devised the simple and novel construction of which the following description, in connection with the accompanying drawings, is a specification, numbers being used to indicate the several parts.

Figure 1:
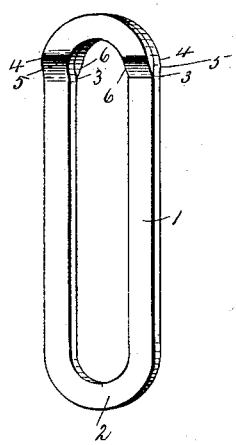
Figure 2:
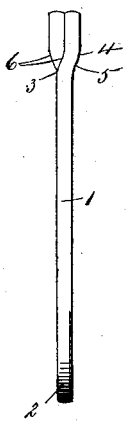
Figure 3:
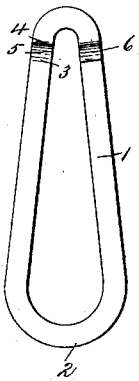

Figure 1 is a perspective of one of my improved links upon an enlarged scale; Fig. 2, an edge view thereof; and Fig. 3 is an elevation in which the shape of the link is shown as slightly changed, this, however, being a mere detail of construction that in no way affects the principle of my invention.

1 denotes the body of the link, and 2 the closed end thereof.

In constructing my improved links I preferably use wire more or less flattened, as shown in the drawings, and cause the flattened sides to lie against each other at the divided end. The peculiarity of my improved construction is that at the divided end of the link, just above the commencement of the curve, I bend each end laterally with relation to the curve, as at 3, and then impart thereto another bend, as at 4, thus bringing the curve of the link into a plane parallel with the plane of the body.

The inclined portion of the link is indicated by 5. The exact angle of inclination of this inclined portion relatively to the plane of the body and curves of the link is not of the essence of my invention. The length of the inclined portion and the angle of inclination are, however, just sufficient to carry the plane of the curve laterally away from the plane of the body a distance equal to one-half the thickness of the metal of the link, as is clearly shown in Fig. 2. The shape of the curves at the ends likewise is not of the essence of my invention, and may be varied to suit the purpose for which the links are intended or the taste of the manufacturer.

At each end of the link I provide bevels 6, the two bevels meeting similar to a knife-edge at the extreme end of each curve. The angle of inclination of the bevels is made coincident with the angle of inclination of inclined portions 5, so that the inner sides of bevels 6 lie closely against and parallel with the inner sides of inclined portions 5, and the outer sides of bevels 6 and of inclined portions 5 end at the plane of the body of the link, as is clearly shown in Fig. 2, thus forming a neat close-fitting joint without cutting away any of the metal and the consequent loss of strength, and without giving to the finished link the clumsy appearance that would otherwise be unavoidable.

Having thus described my invention, I claim—

1. A divided or split link consisting of a piece of metal the ends of which are lapped at one end of the link to form a double thickness of metal, said ends having bends to form offsets equal to half the thickness of the body of the link, and the terminal portions of the said lapped ends being fitted against the said bends to lie partly within the plane of the body of the link, substantially as set forth.

2. A divided link having overlapping portions at one of its ends, said overlapping portions having the offset bends or inclined parts 5, and the ends or terminals of the said overlapping portions being beveled on both sides and arranged to lie against the said bends 5 and partly within the plane of the body of the link, substantially as set forth.

In testimony whereof I affix my signature in presence of two witnesses.

RICHARD A. BREUL.

Witnesses:
A. M. WOOSTER,
C. E. RUGGLES.